(12) United States Patent
Ducato et al.

(10) Patent No.: US 7,460,258 B2
(45) Date of Patent: Dec. 2, 2008

(54) METHOD, COMPUTER SYSTEM AND COMPUTER PROGRAM PRODUCT FOR TRANSMITTING A PRINT JOB FROM A HOST COMPUTER TO A PRINT SERVER

(75) Inventors: Jose La Rosa Ducato, Erding (DE); Michael McGinley, Munich (DE); Jonathan Urry, Markt Schwaben (DE)

(73) Assignee: Oce Printing Systems GmbH, Poing (DE)

( * ) Notice: Subject to any disclaimer, the term of this patent is extended or adjusted under 35 U.S.C. 154(b) by 912 days.

(21) Appl. No.: 10/447,025

(22) Filed: May 29, 2003

(65) Prior Publication Data
US 2004/0008379 A1 Jan. 15, 2004

(30) Foreign Application Priority Data
May 29, 2002 (DE) ................ 102 23 926

(51) Int. Cl.
*G06F 15/00* (2006.01)
(52) U.S. Cl. ............ 358/1.15; 358/1.16; 358/1.18; 358/450; 709/203; 709/219
(58) Field of Classification Search ........ 358/1.15, 358/1.16, 1.18, 450; 709/203, 219
See application file for complete search history.

(56) References Cited

U.S. PATENT DOCUMENTS

| | | | |
|---|---|---|---|
| 4,870,611 A | | 9/1989 | Martin et al. |
| 5,768,488 A | | 6/1998 | Stone et al. |
| 5,845,302 A | * | 12/1998 | Cyman et al. ............ 715/517 |
| 5,940,584 A | | 8/1999 | Züfle |
| 6,023,556 A | * | 2/2000 | Ledgard et al. ............ 358/1.2 |
| 6,952,780 B2 | * | 10/2005 | Olsen et al. ............ 726/26 |
| 7,086,792 B1 | * | 8/2006 | Pangrazio et al. ............ 400/62 |
| 7,158,254 B2 | * | 1/2007 | Ferlitsch ............ 358/1.15 |
| 2002/0191219 A1 | * | 12/2002 | Bondy et al. ............ 358/1.18 |
| 2003/0189725 A1 | * | 10/2003 | Kloosterman et al. ...... 358/1.18 |

FOREIGN PATENT DOCUMENTS

| | | |
|---|---|---|
| DE | 100 17 785 | 10/2001 |
| WO | WO 99/12337 | 11/1999 |
| WO | WO 01/77807 | 10/2001 |

OTHER PUBLICATIONS

IBM Advanced Function Presentation Programming Guide and Line Data Reference.
IBM Infoprint Manager für Windows NT und Windows 2000 06/2000e-business.
IBM Data Stream and Object Architectures Mixed Object Document Content Architecture Reference SC31-6802-05.
Kapitel 14 OCE PRISMApro Server System.

* cited by examiner

*Primary Examiner*—Edward L Coles
*Assistant Examiner*—Chan S Park
(74) *Attorney, Agent, or Firm*—Schiff Hardin LLP

(57) ABSTRACT

In a method, computer system and computer program product for transmitting a print job from a host computer to a print server, variable data, particularly in the format Advanced Format Presentation (AFP) of the print job, are stored in the host computer in a main datafile and resource data that are suited for employment in a plurality of print jobs are stored in the host computer in at least one additional datafile. The variable data and the resource data are automatically united in the host computer to form a print datafile, and the print datafile is transmitted to the print server as complete print job.

15 Claims, 5 Drawing Sheets

METHOD, COMPUTER SYSTEM AND COMPUTER PROGRAM PRODUCT FOR TRANSMITTING A PRINT JOB FROM A HOST COMPUTER TO A PRINT SERVER

BACKGROUND OF THE INVENTION

1. Field of the Invention

The present invention is directed to a method, a computer system and a computer program product for transmitting a print job from a host computer to a print server. It is particularly directed to a method and to a system for processing a print data stream that is edited for output on a printer device. Such an editing typically occurs in computers that process print datafiles or print data from application programs printer-adapted. The print data, for example, are thereby converted in an output stream of a specific print data language such as AFP® (Advanced Function Presentation), PCL or PostScript.

2. Description of the Related Art

In large computer centers, great quantities of print data that comprise up to tens of thousands of pages are typically compiled (in a spooling event) in a host computer (such as a mainframe computer) and print jobs are generated therefrom, the latter being adapted for output on high-performance printer systems such that the high-performance printer systems have an optimum usage factor over time in a production mode. They can thereby be largely utilized in continuous operation. Mainframe computers are often operated with the operating systems OS/390 or z/OS. The largest AFP print jobs are generated worldwide on such mainframe computers.

High-performance printers for processing such gigantic print jobs with printing speeds from approximately 40 DIN A4 pages per minute to more than 1000 DIN A4 pages per minute are described, for example, in the publication *Das Druckerbuch*, edited by Dr. Gerd Goldmann (Océ Printing Systems GmbH), Edition 6, May 2001, ISBN 3-000-00 1019-X. Chapter 14 (pages 14-1 through 14-20) of this publication describe the server system known by the name of PRISMA PRO® that serves for editing print data stream in production printing environments.

The print data format AFP (Advanced Function Presentation) is described, for example, in the publication No. F-544-3884-01 of IBM Corporation bearing the title "AFP Programming Guide and Line Data Reference". The specification for a further data stream with the designation "S/370 Line-Mode Data) is also described in this publication. The print data stream AFP was further-developed into the print data stream MO:DCA that is described in the IBM publication SC31-6892-04 bearing the title "Mixed Object Document Content Architecture Reference". Details of this data stream, particularly the employment of structured fields, are disclosed by U.S. Pat. No. 5,768,488. Below, the print data streams that have just been referenced shall be referred to in simplified fashion as AFP data streams.

For output on a printer system, AFP print data streams are usually converted into a printer-adapted data stream IPDS™ (Intelligent Printer Data Stream). AFP elements that reside at various locations in the AFP data stream or, respectively, derive from various sources are thereby usually merged with the corresponding, variable print data.

The published PCT Patent Application WO 01/77807 A2 discloses a method and a computer system wherein AFP print data is checked and potentially normalized onto a uniform data format, wherein the normalized data is sorted and indexed as needed and wherein, finally, an index datafile, a resource datafile and a datafile with the variable data are output.

U.S. Pat. No. 5,940,584 and Published PCT Patent Application WO 99/12337 A2 disclose methods and systems for archiving print data.

The aforementioned publications and patent applications are herewith incorporated by reference into the present specification.

Due to the relatively expensive computing times of host computers, AFP data are transmitted from the host computer onto a print server platform. As a result thereof, the relatively expensive computing times of the host computer can be saved and the host computer can be relieved of tasks, so that the computing capacity of the host computer is available for other tasks. The possibility of printing at dispersed print locations also favors the use of print severs. Computer programs that run on print servers, further, are often very user-friendly and adapted to a productive employment in optimizing fashion.

AFP print data streams are composed of one or more pages of variable print data, i.e. page-individual print data, and one or more AFP resource data that are provided are required for employment on a plurality of pages in order to be able to print out the AFP print data stream on a printer device. Such resources are, for example, overlay data (overlays), page segments, object contamens or character sets (fonts) as well as formatting elements such as, for example, Formdef and Pagedef.

Printer driver programs are available for the transmission of print data from a mainframe computer to a printer device, for instance the program SPS™ distributed by the assignee, that are not only transfer programs for print data from the spooling event to the printer device but that also comprise further functions that allow an enhancement or, respectively, formatting of print data. With the assistance of what are referred to as Pagedef objects and Formdef objects, positionings can be undertaken, fonts can be selected and pages, segments and overlays can be mixed in. This task can require a CPU performance in the range of 6-8 MIPs. High-performance personal computers (PC) make this computing capacity available for less than one-tenth the costs of a mainframe computer. The outsourcing of this task from the mainframe computer to a PC-based print server is therefore very economical.

Given such an outsourcing, however, the problem often arises that the variable print data and the AFP resource data connected thereto are not all stored in one print datafile but are stored in various datafiles, namely the print data in the spool datafile and the resource data in one or more library datafiles.

A second problem is that AFP resource data are normally used by two or more AFP print applications and are stored in library datafiles without any indication in the library files regarding which applications use which resources.

A third problem is that a fully functional analysis program (such as a AFP parser) is required in order to determine which AFP resources are used by which AFP application because a parsing event at AFP print data is the only way to reliably know which resources the application is using.

Whereas, thus, the variable print data of an AFP print application can be automatically transmitted from a host computer to a print server, for example with the product PSF AFP Download of IBM, the AFP resource data that the AFP print application uses must be separately transmitted. The respective user thereby bears the responsibility that the print server on which the application is printed later has access at the time of printing to the AFP resource data or, respectively, to the libraries that store the resource data.

SUMMARY OF THE INVENTION

It is therefore an object of the present invention to simplify the transmission of print jobs that comprise variable data and resource data from a host computer to a print server for processing print jobs.

This and other objects are achieved by a method for transmitting a print job from a host computer to a print server wherein variable data, particularly in the format Advanced Function Presentation (AFP) of the print job, are stored in the host computer in a main datafile and resource data that are suited for employment by a plurality of print jobs are stored in the host computer in at least one additional datafile; automatically uniting the variable data and the resource data in the host computer to form a print datafile; and transmitting the print datafile to the print server as complete print job.

The objects of the invention are also provided by a computer system for transmitting a print job from a host computer to a print server, whereby variable data are stored in the host computer in a main datafile (spool datafile) and resource data suited for employment in a plurality of print jobs are stored in the host computer in at least one additional datafile (external resources); a router computer program by means of which the variable data and the resource data are automatically united to form a print datafile is provided in the host computer; and the print datafile is transmitted to the print server by the router computer program or by a transfer computer program.

BRIEF DESCRIPTION OF THE DRAWINGS

Exemplary embodiments and further advantages of the invention are described below on the basis of some Figures.

DETAILED DESCRIPTION OF THE PREFERRED EMBODIMENTS

Figure 1:
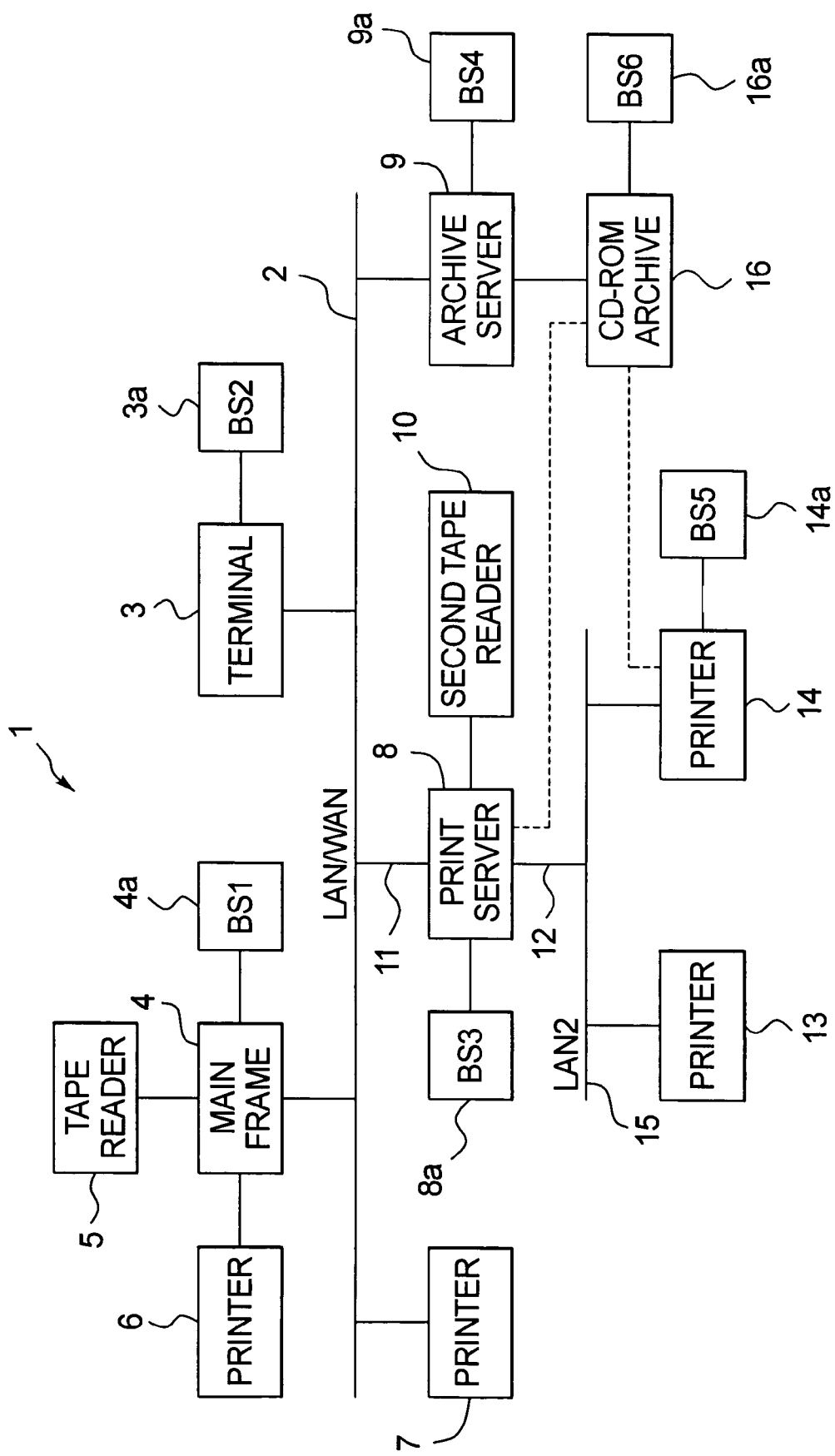
FIG. 1 is a block diagram showing a print production system.

Inventively, the data of a print job are transmitted from a host computer to a print server, whereby variable data are contained in the host computer in a first or, respectively, main datafile and resource data that are suited for employment by a plurality of print jobs are contained in the host computer in at least one, and preferably in a plurality of, additional datafiles. The variable data and the resource data are automatically united in the host computer to form a print datafile, and the print datafile is transmitted to the print server as a print job. Compared to other methods wherein, for example, the variable data are automatically transmitted from the host computer to the print server but a user must manually see to it that the print server has access to the resource data stored in the host computer or has a copy of them at a point in time at which the print job must in fact be printed, the printout is considerably facilitated for the user by the automatic combining of the variable data with the appertaining resource data. Further, the printout becomes significantly more dependable and reliable, particularly in a print production environment that is not also connected in data-oriented terms to the host computer that generates the print jobs.

Compared, also, to an alternatively possible processing procedure wherein the user can process the print data with a parsing program, for example the program CIS (Converting Indexing Sorting) disclosed by the assignee or the program ACIF™ disclosed by International Business Machines Corp. (IBM), in an additional processing step before the print data are transmitted to the collecting device (spooler) within the mainframe computer. Compared to such a method, the present invention has the advantage that the collecting and checking of the print data, the compiling of resources and the generating of the checked document datafile can ensue fully automatically and without modifications in existing user scripts (ICL), whereas the above-described method must be separately and manually implemented for every individual user script (ICL) to be printed.

Upon retention of already existing print jobs, for example a regular, monthly print of an invoice, the invention allows the user to employ the same forms and to automatically insert all resource data respectively current at the time the job is prepared into the print data stream, namely the resource data required by the AFP print application. The print mode respectively updated via the resources is particularly characterized by forms (overlays) that must be routinely adapted with new business data such as, for example, telephone numbers, names, signatures of officials or management personnel. What can be particularly achieved with the invention is that the print data are fully automatically subjected to a parsing process wherein they are checked in view of completeness, integrity with prescribed definitions and the knowledge of or, respectively, availability of resources called in the print data. The parsing process is thereby particularly generated during the course of the transmission of the data from the spool program module of the host computer to the transmission module (router) in the mainframe computer. Particularly with the variable AFP print data, further, a parsing functionality can ensue with the external resource data present in the mainframe computer, so that these are also subjected to a parsing process in view of their compatibility with the variable AFP print data. During the course of this resource parsing process, the resources required for the respective print job can be packaged right away and readied for the linking of these resources with the appertaining, variable AFP print data, so that a data stream which has been completely provided with inline resources arises. The AFP print data and/or the AFP resource data that are required in the print job can also be compressed in a compression unit and then be transmitted to the print server via the router program module. In particular, the compression unit can thereby effect a shortening or, respectively, optimization of the transmission time between the host computer and print server.

According to an advantageous exemplary embodiment of the invention, the variable data are stored in the data format Advanced Function Presentation™ (AFP) and are administered by a spool computer program. In particular, the resource data are stored in a plurality of library datafiles.

It is also advantageous to respectively implement the variable data belonging to a print job and the resource data of the print job with the same router program. The variable data and/or the resource data are preferably checked according to given rules, converted, indexed and/or sorted with a parsing program. At least some of the rules thereby employed can preferably be individually set as parameter-controlled with an operating computer program. The checking of the resource data preferably ensues at least partly on the basis of the variable data.

According to another advantageous exemplary embodiment, the variable data and/or the resource data are compressed before they are transmitted from the host computer to the print server.

FIG. 1 shows a high-performance printer system 1 wherein various system components are connected via a data network 2, which can be a local network (Local Area Network, LAN) or a larger network (Wide Area Network, WAN). At least one client terminal 3 on which print jobs can be generated is connected to the network 2. The terminal 3 is a known computer (for example, a personal computer PC) with a connected picture screen 3a.

Optionally, the print jobs can also be generated on a host computer (such as a mainframe computer) 4 or the mainframe 4 can at least insert data into the print job. The mainframe 4 of the computing center is controlled via a suitable operating system controller such as MVS, BS2000 or VSE. Control functions and displays can ensue at the mainframe 4 via the picture screen 4a connected thereto. A tape reader 5 as well as a first high-performance printer 6 are also directly connected to the mainframe 4.

A second printer 7, a print server 8 as well as an archive server 9 are also connected to the data network 2. The print server 8 is in turn connected to a second tape reader 10 as well as to a picture screen 11. In addition to the connection 11 between the print server 8 and the main data network 2, the print server 8 is connected via the connection 12 to a second, local network 15, to which further printers 13 and 14 are connected. The print server 8 as well as the printer 14 can be optionally connected to a system for the production of archive stores (for example, on CD-ROM) 16. However, the archive system 16 is mainly appended to the archive server 9. Additional picture screen 9a, 16a and 14a are connected to the respective devices 9, 16 and 14.

Figure 2:
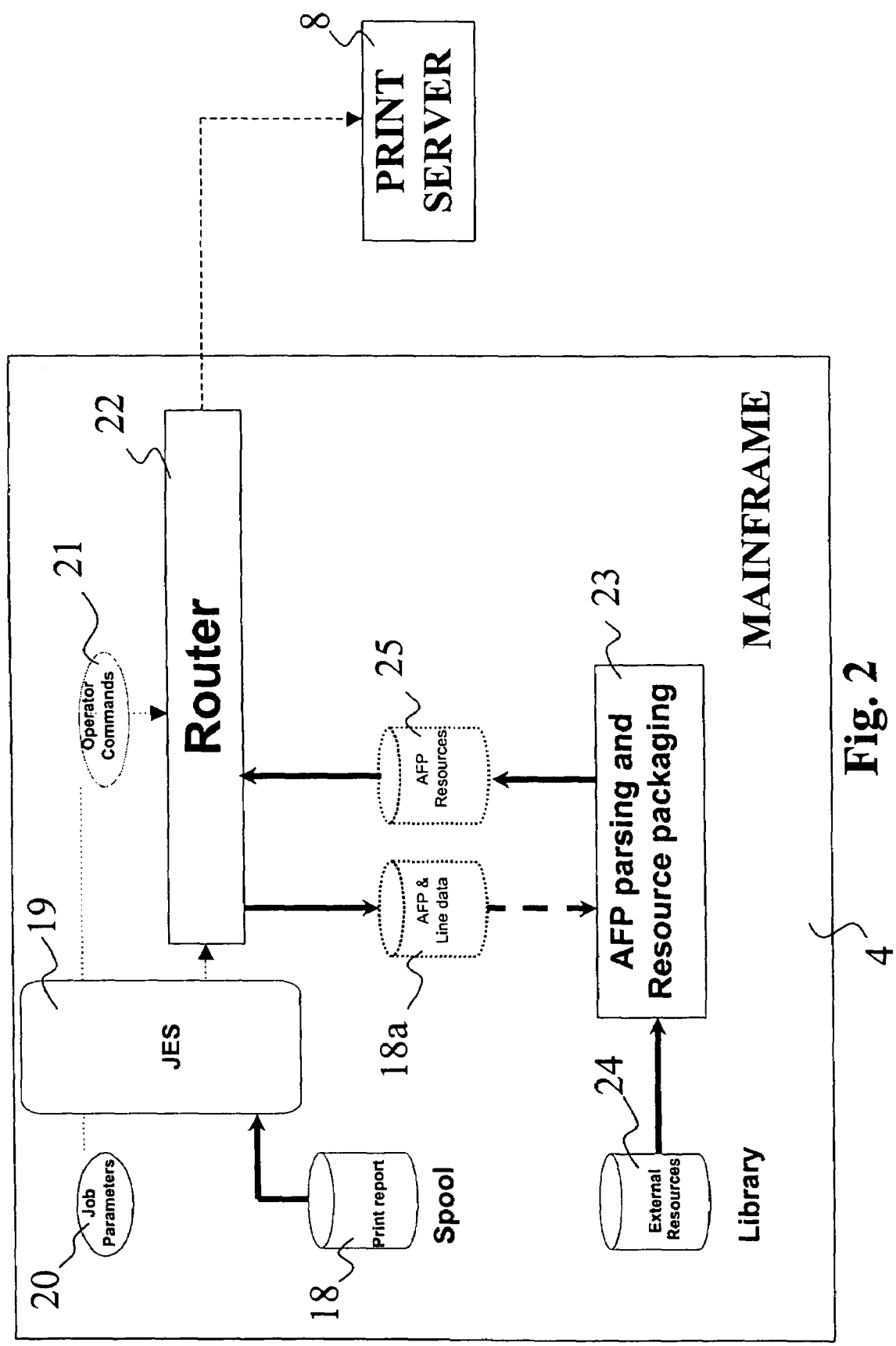
FIG. 2 is a functional block diagram of the transmission of print data from a host computer to a print server.

FIG. 2 illustrates the process sequencing in the host computer 4 for editing the print data stream for the transmission to the print server 8. AFP line data is generated with a spooling computer program, whereby the variable data or, respectively, the datafile of a print job allocated to them are collected. As the line data datafile 18 (print report), the spooling computer program then transmits the complete variable print data in the AFP line data format to a print job administration module 19 (JES, job entry sub-system). The print job administration module 19 also receives print job parameters via a job parameter datafile 20 that is allocated to the AFP line data 18. AFP-typical parameters, datafiles or, respectively, objects can be deposited as job parameters, for example PAGEDEF-name, FORMDEF-name, name of the external resource library (userlib), the TCP/IP address of a destination server, etc. The print job administration module 19, further, can receive operator commands 21 via an operating surface that are employed for the control of the further processing steps of the AFP data. Alternatively to the AFP line data, the spooling computer program can also collect data of other formats, for example data in the format MO:DCA. Such data are then converted into normed AFP data in a separate process step (see FIG. 3).

The print job administration module 19 transmits the AFP line data to a connection node module (router) 22. Before this routing module 22 forwards the print data to the print server, the AFP line data or, respectively, respective copies or, respectively, partial copies 18a of the line data are transmitted to an analysis and combining module 23 (AFP parsing and resource packaging). Both the variable AFP line data 18a as well as external resources 24 that are available in the mainframe computer 4 and needed (i.e., for example, by calls within the AFP line data) for the print job to be processed are analyzed in this module, checked in view of their consistent, standardized formatting, potentially manipulated such that they exactly correspond to a predefined norm (normalization process), and, finally, all of those resources that are needed in the current print job are deposited in a packaged AFP resource datafile 25. The process sequencing in the analysis and combining module 23 are essentially or exactly those processes shown in FIG. 3 and are at least partially converted by the same control modules or, respectively, program sections of a computer program module as described in FIG. 3.

After checking the variable data and the resource data as well as assuring that the variable data and the packaged resource data correspond to the same norms or, respectively, rules, they can then be compressed in the compression module 27 so that this potentially extremely large data quantity of variable data and appertaining resources can be transmitted to the print server 8 faster via the connection node module 22. The data assembled in this way form a print job that is complete in and of itself that need not access any additional data, particularly resources, because all resource data needed in the print job are already integrated in the print data as inline resources.

One advantage of this procedure wherein the resource data are united with the print data to form a complete print job is that these print job data can be printed out on an arbitrary printing system. This printing system can be decentrally designed and no longer requires any connection to the original host computer for a complete printing. Further, such print data assure that information belonging to the print job, i.e. the addresses as well as the names of any responsible parties given, for example, letters, are available exactly associated to a print job, even if such values as addresses, editors, members of the board, etc., have already changed at the host computer. Each print job has thereby stored exactly that status of information—including resource information—that was determinant when it was created. This advantage can also be utilized, in particular, when the print data are directly deposited in a data archive without being printed or parallel to the printing of after the printing. Further, the resources together with the print job can thereby be stored in exactly that version that was valid on the printing or, respectively, archiving data. Suitable methods for archiving are disclosed, for example, in the initially cited U.S. Pat. No. 5,940,584 A and Published PCT Application WO 99/12337 A2. These publications are now again explicitly incorporated by reference into the present specification.

Figure 3:
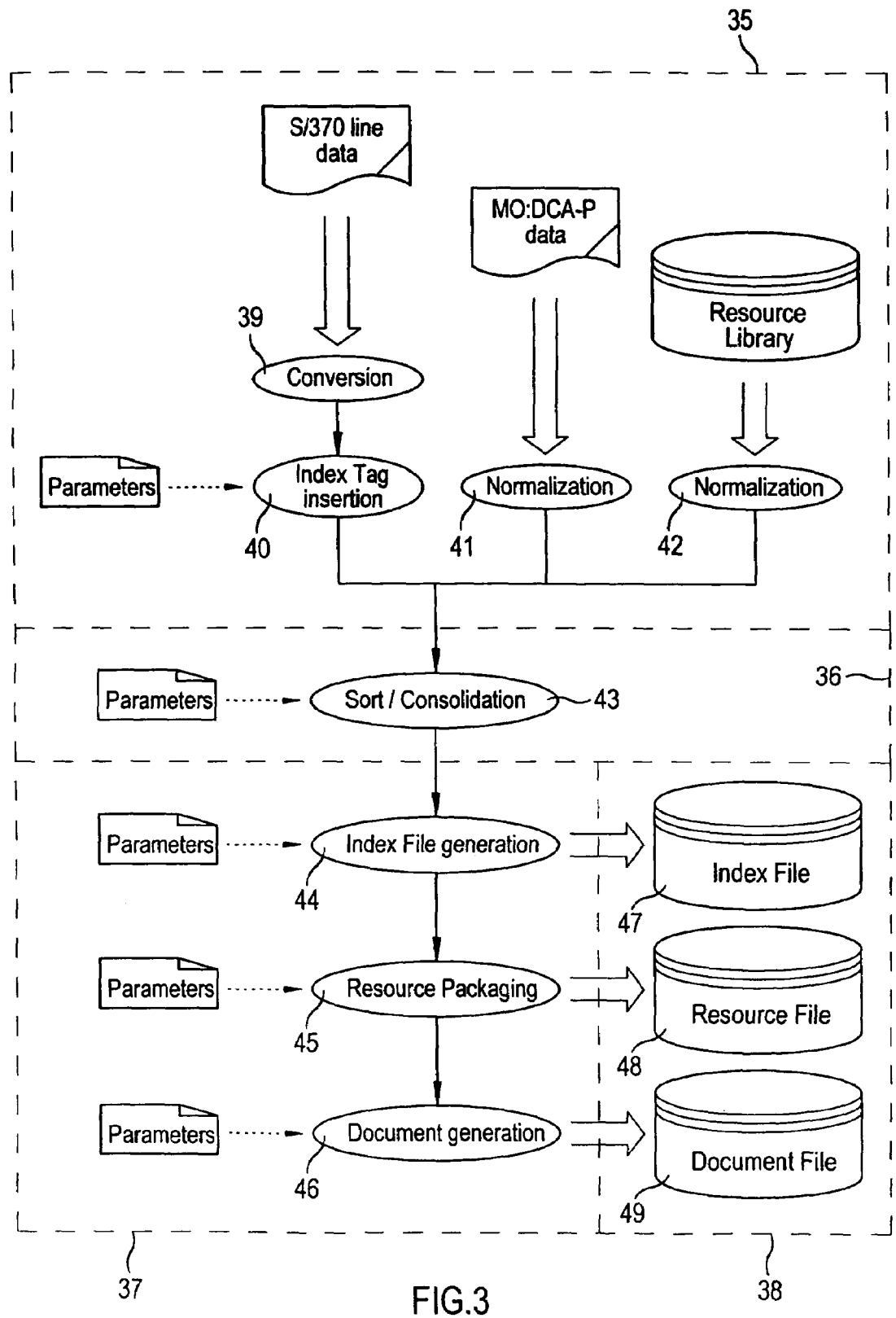
FIG. 3 is a functional block diagram of a flowchart of the processing of print data within the host computer.

FIG. 3 shows how various input data streams are processed within thee analysis and combining module 23 in order to be able to undertake an indexing and—optionally—a sorting of the print data according to predefined criteria corresponding to the input parameters (sorting parameters, sorting properties).

Incoming print data streams are thereby processed in a plurality of process stages. In a first process stage 35, the incoming data streams are normalized, i.e. converted onto a normed, uniform data format. In a second step 36, the normed print data are sorted; in a third step 37, the data to be output are converted, and the output data are generated in the fourth step 38.

Within the first process stage 35, for example, S/370 line data are converted onto the internal, normed AFP print data format in a first conversion process 39. The data converted in this way are then supplemented with index features in the process 40, the index features being produced on the basis of application-specific parameters.

Data that already largely correspond to the internal AFP data format such as, for example, MO:DCA data or resource data are only slightly modified in the normalization processes 41 and 42 so that they exactly correspond to the internal AFP data format. The sorting and consolidation process 43, which sequence in the second process stage 36, is likewise controlled by external parameters that can be defined either job-specifically or individually directly at the host (mainframe).

The processes 44 for forming an index datafile 47 for forming the resource datafile and 46 for generating the document 49 from resource data and variable data that sequence in the third process stage 37 are also controlled with respectively parameters supplied from the outside.

In the fourth process stage 38, finally, the index datafile 47, the resource datafile 48 and the document datafile 49 are output, as a result whereof the complete, sorted print data stream is available for printing.

Further details of the normalization, sorting and indexing event are disclosed by the initially cited Published PCT Application WO 01/77807 A2, which is again incorporated by reference here into the present specification.

Figure 4:
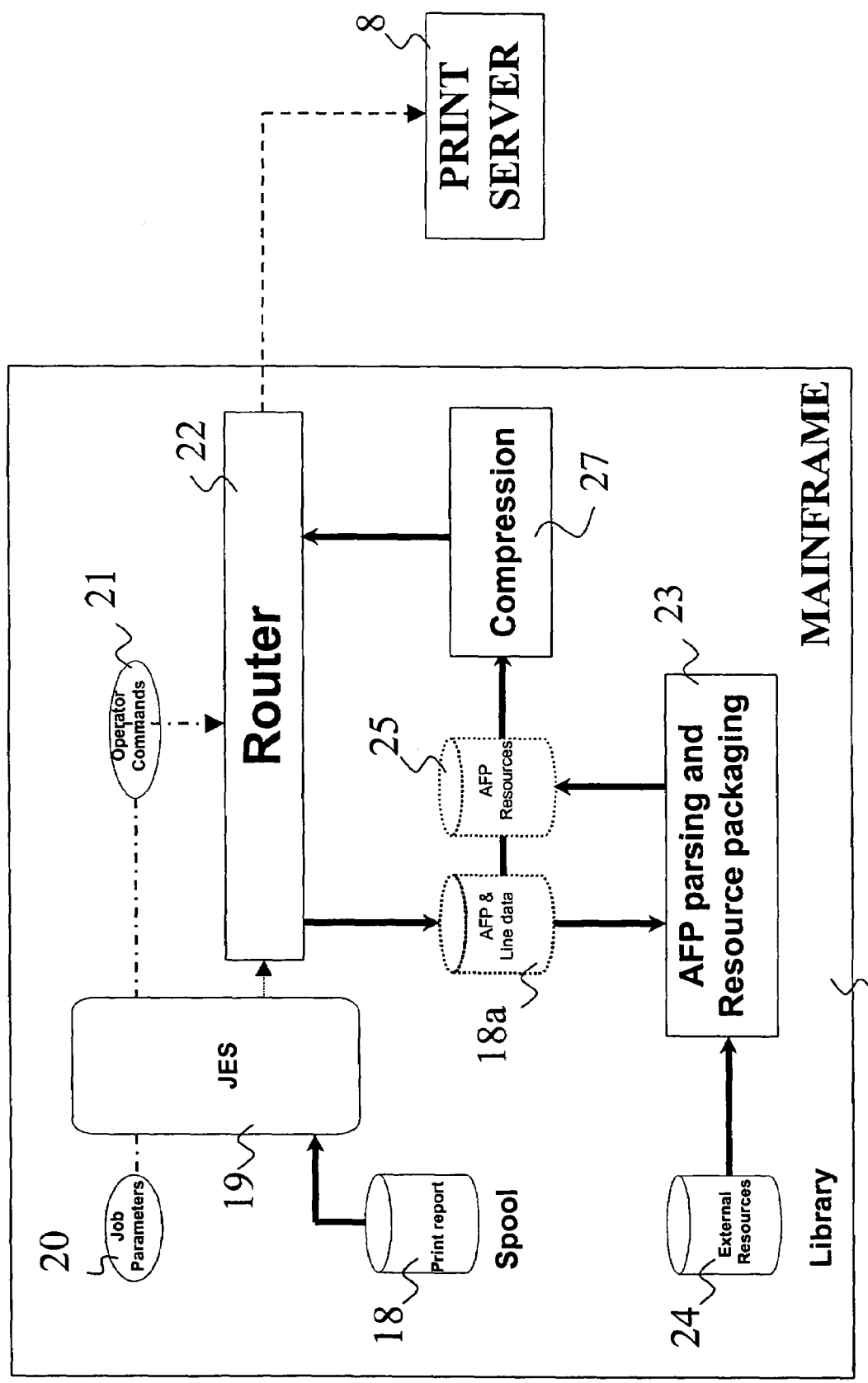
FIG. 4 is a functional block diagram of the transmission of print data from a host computer to a print server with a data compression.

FIG. 4 shows nearly the same arrangement as FIG. 2. The reference characters were therefore largely retained. Here, too, both the AEP line data 18*a* as well as the external resource data 24 are localized, read and checked in view of their agreement with given rules, particularly with the AFP rules, in the analysis and combining module 23. Subsequently, the respectively appertaining AFP resource data are deposited for the respectively, variable AFP and line data, and a combined datafile containing AFP line data and corresponding resources is handed back to the router 22. At the latter, the complete datafile of the print job is then forwarded to the print server 8. Via the operator commands 21, a connection node module 22 (router), an analysis and combining module 23 and/or a compression module 27 (see FIG. 4) can be controlled such that two operating conditions are possible, namely a first operating condition wherein the complete print datafile (with resources) is handed over in uncompressed form to the connection node module 22 (router) or a second operating condition wherein the complete print datafile 26 is handed over in a compressed form to the router 22.

Figure 5:
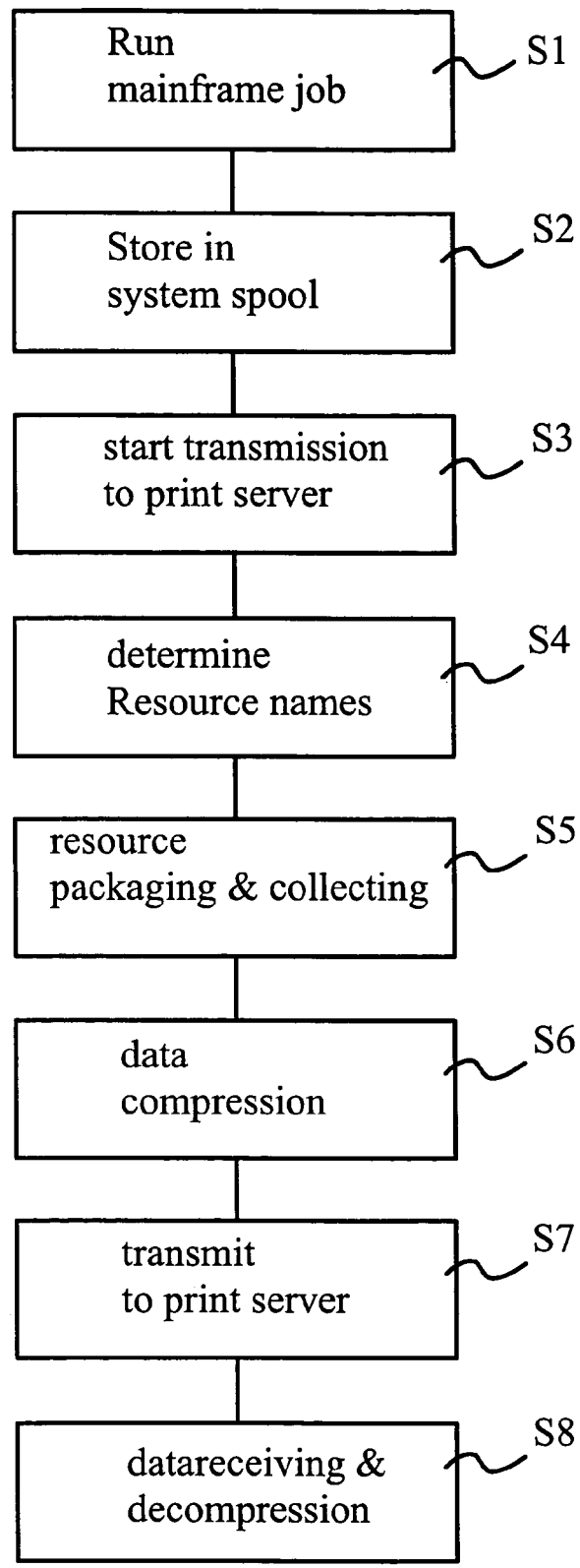
FIG. 5 is a flowchart of a method according to the present invention.

FIG. 5 describes a typical work sequence that can be implemented with the invention. In a first step S1, a print job is generated on a mainframe computer as though it were printed out on a local printer. In step S2, the result of the print job is deposited in the system buffer memory (spool). In step S3, the operator of the spooling unit starts a transmission software that transmits the application to a print server. Upon utilization of the job parameters defined by the operator, the transmission software determines the name of the AFP resource libraries that are to be used (step S4). The connection node module implements the AFP analysis and checking, records all required resource data and allocates them to the print data (step S5). In step S6, the AFP resource data and the variable print data are concentrated in a datafile and potentially compressed parameter-controlled. The potentially compressed datafile is transmitted to the destination print server in step S7. In step S8, the AFP datafile containing everything is received and decompressed. As application that contains all required data, the print datafile can be locally printed, forwarded to a different print server and/or deposited in an archiving system.

Exemplary embodiments of the invention have been described; it is thereby clear that further developments can be recited at any time, for example that the entire system is linked into a document management system. The described components can be realized on the hardware side in the form of controllers or can also be realized by computer programs (software) with corresponding computers/processors on which these programs run.

Although other modifications and changes may be suggested by those skilled in the art, it is the intention of the inventors to embody within the patent warranted hereon all changes and modifications as reasonably and properly come within the scope of their contribution to the art.

The invention claimed is:

1. A method for transmitting a complete advanced function presentation (AFP) print job according to an AFP specification from a host computer to a print server, comprising the steps of:
    storing AFP data format variable data in the host computer in a main data file;
    storing AFP resource data suited for employment by a plurality of print jobs in the host computer in at least one additional data file;
    storing print job parameters used to control the AFP print job in the host computer in a job parameter data file;
    allocating the AFP print job parameters to the AFP variable data for said AFP print job;
    allocating the AFP resource data for said AFP print job;
    analyzing the AFP variable data and the AFP resource data for said AFP print job for consistency with given AFP rules from said AFP specification, and also checking for a standardized AFP formatting from said AFP specification of the AFP variable data and the AFP resource data for said AFP print job, and if the standardized formatting is not met, then performing a formatting to conform the variable data, the resource data, or both the variable data and the resource data to said standardized AFP formatting, and then automatically combining the AFP variable data and the AFP resource data in the host computer to form a complete print data file for the complete AFP print job; and
    transmitting the complete print data file to the print server ad the complete AFP print job.

2. A method of claim 1 wherein said step of allocating the print job parameters to the AFP variable data is performed by a job administration module.

3. A method of claim 1 wherein said variable data are administered by a spool computer program.

4. A method according to claim 1 wherein the resource data are stored in a plurality of library data files.

5. A method of claim 1 wherein said step of combining of the variable data of the print job and the resource data of the same print job to form the complete print data file is performed by a computer program of a router module.

6. A method of claim 1 including a step of applying predetermined rules for a parsing computer program to perform at least one of checking, converting, indexing, and sorting of at least one of the variable data and the resource data.

7. A method according to claim 1 including the step of checking the resource data for compatibility with the variable data.

8. A method of claim 1 comprising the further step of compressing at least one of the variable data and the resource data before transmitting the compressed data from the host computer to the print server.

9. A method according to claim 1 further comprising a step of receiving operator commands for control of processing of the variable data.

10. A computer-implemented system for transmitting a complete advanced function presentation (AFP) print job according to an AFP specification from a host computer to a print server, comprising:

a main data file in which AFP variable data are stored in the host computer as a spool data file;

at least one additional data file in which AFP resource data suited for employment in a plurality of AFP print jobs are stored in the host computer as external resource;

a job parameter data file storing print job parameters used to control the AFP print job in the host computer;

a print job administration module which receives said print job parameters from said job parameter data file and allocates them to the AFP variable data for said AFP print job;

an analyzing and combining module for parsing and resource packaging which receives said AFP variable data and AFP resource data, which allocates the AFP resource data for said AFP print job, which analyzes the variable data and the resource data for said print job for consistency with given AFP rules from said AFP specification, which checks the AFP variable data and the resource data for said print job for standardized AFP formatting from said AFP specification and if the standardized formatting is not met then performing a formatting to conform the variable data, the resource data, or both the variable data and the resource data to said standardized AFP formatting, and which automatically combines the AFP variable data and the AFP resource data to form a complete AFP print data file; and a routing module which receives said complete AFP print data file from said analyzing and combining module and which transmits the complete AFP print data file to the print server.

11. A system of claim 10 comprising a computer-readable medium for storing a spool computer program which administers storing of the variable data.

12. A system of claim 10 wherein a plurality of library data files are provided in the host computer in which the resource data are stored.

13. A system of claim 10 comprising a computer-readable medium for storing a program for checking said resource data at least partially on the basis of the variable data.

14. A system of claim 10 comprising a computer readable medium for storing a program which compresses at least one of the variable data and the resource data before transmitting the compressed data from the host computer to the print server.

15. A system according to claim 10 wherein said routing module receives operator commands for control of processing steps of the variable data.

* * * * *